United States Patent
Smith et al.

(10) Patent No.: US 11,795,803 B2
(45) Date of Patent: Oct. 24, 2023

(54) METHOD OF REMOVING HYDROCARBONS FROM PRODUCED WATER

(71) Applicant: Equinor Energy AS, Stavanger (NO)

(72) Inventors: Jens Bragdø Smith, Stavanger (NO); Karen Anne Gudbrandsen, Stavanger (NO); Svein Viggo Aanesen, Skien (NO); Anne Finborud, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 995 days.

(21) Appl. No.: 16/483,651

(22) PCT Filed: Jan. 31, 2018

(86) PCT No.: PCT/NO2018/050028
§ 371 (c)(1),
(2) Date: Aug. 5, 2019

(87) PCT Pub. No.: WO2018/143821
PCT Pub. Date: Aug. 9, 2018

(65) Prior Publication Data
US 2019/0352202 A1  Nov. 21, 2019

(30) Foreign Application Priority Data
Feb. 6, 2017 (GB) .................................. 1701941

(51) Int. Cl.
| E21B 43/40 | (2006.01) |
| B01D 17/02 | (2006.01) |
| C02F 1/24 | (2023.01) |
| C02F 1/38 | (2023.01) |
| C02F 1/52 | (2023.01) |
| C09K 8/588 | (2006.01) |
(Continued)

(52) U.S. Cl.
CPC .......... *E21B 43/40* (2013.01); *B01D 17/0205* (2013.01); *B01D 17/0214* (2013.01);
(Continued)

(58) Field of Classification Search
CPC .......... C02F 1/5245; C02F 1/24; C02F 1/385; C02F 2101/32; C02F 2103/10; C02F 1/38;
(Continued)

(56) References Cited

U.S. PATENT DOCUMENTS

| 4,182,689 A | 1/1980 | Presley et al. |
| 6,019,912 A | 2/2000 | Bellos |
(Continued)

FOREIGN PATENT DOCUMENTS

| FR | 2790979 A1 * | 9/2000 | ............... B03B 9/00 |
| WO | WO-0007687 A1 * | 2/2000 | ......... B01D 17/0217 |
(Continued)

OTHER PUBLICATIONS

Small_definition_NPL.pdf (Year: 2022).*
(Continued)

*Primary Examiner* — Ekandra S. Miller-Cruz
(74) *Attorney, Agent, or Firm* — Birch, Stewart, Kolasch & Birch, LLP (57) ABSTRACT

The present invention relates to a method for removing hydrocarbons from produced water, comprising: (i) separating produced water from a hydrocarbon and water mixture extracted from a subterranean formation: (ii) contacting said produced water with multivalent metal cations to produce a mixture of produced water and multivalent metal cations; and (iii) removing hydrocarbons from said mixture in a hydrocyclone and/or a compact flotation unit to give treated produced water, wherein the concentration of hydrocarbons in said produced water is less than 10% wt.

22 Claims, 6 Drawing Sheets

(51) Int. Cl.
  *C02F 101/32* (2006.01)
  *C02F 103/10* (2006.01)
  *E21B 43/20* (2006.01)

(52) U.S. Cl.
  CPC .......... *B01D 17/0217* (2013.01); *C02F 1/24* (2013.01); *C02F 1/385* (2013.01); *C02F 1/5245* (2013.01); *C09K 8/588* (2013.01); *C02F 2101/32* (2013.01); *C02F 2103/10* (2013.01); *E21B 43/20* (2013.01)

(58) Field of Classification Search
  CPC ........... C02F 1/5236; B01D 17/0205; B01D 17/0214; B01D 17/0217; B01D 17/0208; B01D 17/047; C09K 8/588; E21B 43/40; E21B 43/20; E21B 43/34; B03D 1/00
  USPC ....................................................... 210/747.1
  See application file for complete search history.

(56) References Cited

U.S. PATENT DOCUMENTS

| | | | | |
|---|---|---|---|---|
| 6,913,080 | B2 * | 7/2005 | Lehman | C09K 8/62 166/305.1 |
| 9,315,403 | B1 * | 4/2016 | Laur | C02F 3/322 |
| 2014/0041856 | A1 | 2/2014 | Janssen et al. | |
| 2014/0352958 | A1 * | 12/2014 | Van Batenburg | E21B 43/162 166/268 |
| 2016/0137928 | A1 | 5/2016 | Esmaeili et al. | |
| 2016/0297690 | A1 * | 10/2016 | McLelland | C02F 1/5236 |

FOREIGN PATENT DOCUMENTS

| | | | | |
|---|---|---|---|---|
| WO | WO 2010/005312 A1 | 1/2010 | | |
| WO | WO-2016058961 A1 * | 4/2016 | ........... | B01D 61/147 |
| WO | WO 2016/164601 A1 | 10/2016 | | |
| WO | WO 2017/123095 A1 | 7/2017 | | |
| WO | WO 2017/131525 A1 | 8/2017 | | |

OTHER PUBLICATIONS

Liu_ASP_NPL.pdf (Year: 2010).*
International Search Report for PCT/NO2018/050028 (PCT/ISA/210) dated Apr. 10, 2018.
United Kingdom Combined Search and Examination Report, issued in Priority Application No. 1701941.5, dated May 25, 2017.
Written Opinion of the International Searching Authority for PCT/NO2018/050028 (PCT/ISA/237) dated Apr. 10, 2018.

* cited by examiner

METHOD OF REMOVING HYDROCARBONS FROM PRODUCED WATER

INTRODUCTION

The present invention relates to a method for removing hydrocarbons from produced water (i.e. to deoiling produced water) using multivalent cations and to the use of multivalent cations for removing hydrocarbons from produced water and for increasing the efficiency of hydrocarbon removal methods, e.g. in a hydrocyclone and/or in a compact flotation unit. The invention also relates to a method of recovering hydrocarbons from a hydrocarbon-containing formation, wherein the produced water is treated to remove hydrocarbons using multivalent cations and to a system for removing hydrocarbons from produced water.

BACKGROUND

Chemical enhanced oil recovery (cEOR) is expected to play a major role in the future of global crude oil production. cEOR methods include the use of polymer floods wherein, for example, a water-soluble polymer is injected into the reservoir, typically in a brine solution. Polymer flooding can result in a significant increase in oil recovery compared to conventional water flooding techniques. Compared to other EOR methods, it is also simple, cost effective, low risk and has the advantage that it can be used over a wide range of oil reservoir conditions.

The polymer injected in a polymer flood is generally high molecular weight and most critically can increase the viscosity of the injected water. Amongst the most commonly used polymers in cEOR methods are acrylamide-based polymers, e.g. polyacrylamide (PAM) and hydrolysed polyacrylamides (HPAM). The polymer is dissolved in the injected water to increase its viscosity and to increase the sweep efficiency in the reservoir. When water is injected into an oil reservoir it finds the path of least resistance. Where the remaining oil has a higher viscosity than the injected water, the water will finger through this oil and effectively bypass it. This results in low sweep efficiency and a loss in recovery of oil. By decreasing the mobility ratio between the water and oil, sweep efficiency is enhanced. This results in a higher recovery of oil from the reservoir.

The polymer in the injection water, which alters its physical and chemical behaviours, ultimately breaks through with the production fluid and changes the production fluids' physical and chemical characteristics. Typically the production fluid is separated in a bulk separator into hydrocarbon and produced water. A significant proportion of the polymer from the polymer flood is present in the produced water phase. This causes problems during the subsequent water treatment processes that are required to enable the water to be recycled or dumped.

A method has previously been disclosed in U.S. Pat. No. 4,182,689 wherein oil-in-water emulsions are separated by adding a cation of an amphoteric metal to the emulsion and then treating the resulting flocculate with a strong base. Similarly a method has been disclosed in WO2016/164601 of adding multivalent cations to production fluid to reduce the water solubility of surfactants therein to allow for their effective removal. WO2016/164601 also mentions removal of polymer of the production fluids but does not disclose removal of polymer from produced water. Additionally neither U.S. Pat. No. 4,182,689 nor WO2016/164601 disclose hydrocarbon removal from produced water in a hydrocyclone or compact flotation unit.

The presence of the polymer in the produced water significantly reduces the hydrocarbon removal efficiency of hydrocyclones and compact flotation units. This is because of the impact of the polymer on the properties of the produced water. The presence of the polymer increases the viscosity and the elasticity of the water and this reduces the efficiency of hydrocarbon removal in hydrocyclone units. Similarly the increase in viscosity makes removal in a compact flotation unit more problematic and the presence of the polymer additionally interferes with the ability of flocculants to induce flocculation in the flotation tank.

SUMMARY OF THE INVENTION

Viewed from a first aspect, the present invention provides a method for removing hydrocarbons from produced water, comprising:
  (i) separating produced water from a hydrocarbon and water mixture extracted from a subterranean formation;
  (ii) contacting the produced water with multivalent metal cations to produce a mixture of produced water and multivalent metal cations; and
  (iii) removing hydrocarbons from said mixture in a hydrocyclone and/or a compact flotation unit to give treated produced water,
wherein the concentration of hydrocarbons in said produced water is less than 10% wt.

Viewed from a further aspect the present invention provides the use of multivalent metal cations for removing hydrocarbons from produced water, wherein said multivalent metal cations are added to produced water, separated from a hydrocarbon and water mixture extracted from a subterranean formation, in a hydrocyclone and/or compact flotation unit and the concentration of hydrocarbons in said produced water is less than 10% wt.

Viewed from a further aspect the present invention provides the use of multivalent metal cations to increase the efficiency of a hydrocarbon removal method in a hydrocyclone and/or a compact flotation unit, wherein said multivalent metal cations are added to produced water, separated from a hydrocarbon and water mixture extracted from a subterranean formation, in the hydrocyclone and/or compact flotation unit.

Viewed from a further aspect the present invention provides a method of recovering hydrocarbons from a hydrocarbon-containing formation, said method comprising:
  (i) providing water, and optionally polymer, to a hydrocarbon-containing formation;
  (ii) allowing said water to contact at least a proportion of the hydrocarbons in said formation;
  (iii) recovering from said formation a mixture comprising hydrocarbons, water and optionally polymer;
  (iv) separating said mixture into recovered hydrocarbons and produced water; and
  (v) treating said produced water according to the method as hereinbefore described.

Viewed from a further aspect the present invention provides a system for removing hydrocarbons from produced water comprising:
  (i) a bulk separator for separating a mixture of hydrocarbons and water into hydrocarbons and produced water;
  (ii) a hydrocyclone and/or a compact flotation unit for removing hydrocarbon from the produced water;
  (iii) a line for adding multivalent cations into the produced water; and
  (iv) a tank for storing multivalent metal cations, wherein the tank is fluidly connected to the line for adding multivalent ions and the line for adding the multivalent cations into the produced water is prior to the hydrocyclone and/or compact flotation unit.

DEFINITIONS

As used herein the term "produced water" refers to water extracted, along with hydrocarbons, from a hydrocarbon containing formation and thereafter separated from hydrocarbons in a bulk separator. Produced water comprises water and relatively low amounts of hydrocarbon, typically less than 10% wt hydrocarbons.

As used herein the term "anionic polymer" refers to a polymer having negatively charged side groups. Anionic polymers have a net negative charge.

DETAILED DESCRIPTION OF THE INVENTION

The method of the present invention, for removing hydrocarbons from produced water, comprises:
(i) contacting produced water with multivalent metal cations to produce a mixture of produced water and multivalent metal cations; and
(ii) removing hydrocarbons from said mixture to give treated produced water,
wherein the concentration of hydrocarbons in said produced water is less than 10% wt.

In the methods of the present invention produced water is cleaned or purified. More specifically the amount of hydrocarbon present in the produced water is reduced. Hydrocarbon may also be completely removed from produced water in the methods of the invention.

The produced water from which hydrocarbons are removed in the methods of the present invention is preferably water separated from a hydrocarbon and water mixture, and particularly mixtures extracted from a subterranean formation, e.g. an oil well. A number of methods are used to extract mixtures from subterranean formations including polymer flooding. In polymer flooding a high molecular weight, viscosity enhancing polymer is added to water and the mixture is injected into a subterranean formation. The presence of the polymer in the water decreases the mobility of the water and as a consequence improves the sweep efficiency of the flood in the formation. Eventually the polymer present in the water flood, returns to the surface in the production fluid, i.e. in the mixture of hydrocarbons and water. The methods of the present invention are particularly suitable for removing hydrocarbon from water from a hydrocarbon and water mixture extracted from a hydrocarbon formation by a polymer flood. This is because the methods of the invention can minimise or avoid the problems typically caused by the presence of the polymer in the mixture.

When a hydrocarbon and water mixture is extracted from a formation, it generally undergoes a bulk separation in a bulk separator wherein hydrocarbon, water, gas and solids are separated. The methods of the present invention are preferably carried out on the water obtained from this bulk separation in a bulk separator.

The produced water from which hydrocarbons are separated in the methods of the invention predominantly comprises water. Preferably at least 90% by weight, more preferably at least 95% by weight, yet more preferably at least 97% by weight, still more preferably at least 98% by weight, e.g. at least 99% by weight of the water treated is water. The maximum concentration of water may be, for example, 99.9% by weight.

In the methods of the present invention the produced water from which hydrocarbons are removed may comprise up to 10% wt hydrocarbon. The amount of hydrocarbon present in the water may be, for example, 0.0002 to 10% wt. More typically, however, the water from which hydrocarbons are removed in the method of the invention comprises 0.01 to 5% wt hydrocarbon, more preferably 0.015 to 1% wt hydrocarbon, still more preferably 0.02 to 0.1% wt hydrocarbon, e.g. about 0.025 to 0.05% wt hydrocarbon. Amounts up to 10% wt of hydrocarbon can, however, be present. This occurs, for instance, when there is a problem such as the presence of an unstable emulsion in the bulk separation process.

The hydrocarbon present in the water is generally a mixture of different types of hydrocarbon having a range of molecular weights. The hydrocarbon present in the water may be dispersed therein or dissolved therein. The method of the present invention is, however, aimed at removal of hydrocarbon dispersed in the water.

The produced water from which hydrocarbons are removed in the methods of the invention preferably comprises polymer. The amount of polymer present in the produced water is typically 50-5000 ppm wt. Preferably the amount of polymer present in the produced water is 100 to 2000 ppm wt, more preferably 200 to 1000 ppm wt and still more preferably 300 to 800 ppm wt.

The polymer present in the produced water is preferably a polymer used in a polymer flood. The polymer may be any conventional polymer used in polymer flood operations. Preferably the polymer has a molecular weight of 1 million to 20 million. Preferably the polymer is water-soluble.

Particularly preferably the polymer is anionic. Thus preferably the polymer comprises monomers having negatively charged side-groups. Representative examples of negatively charged side-groups that may be present in the polymer are carboxylate, sulfonate and phosphonate.

Particularly preferably the polymer present in the produced water may be selected from the group consisting of polyacrylamides, partially hydrolyzed polyacrylam ides, polyacrylates, ethylenic co-polymers, biopolymers, carboxymethylcelloluses, polyvinyl alcohols, polystyrene sulfonates, polyvinylpyrrolidones, poly (2-acrylamide-methyl propane sulfonate) (AMPS), and combinations thereof. Examples of ethylenic co-polymers include co-polymers of acrylic acid and acrylamide, acrylic acid and lauryl acrylate, and lauryl acrylate and acrylamide. Examples of biopolymers include xanthan gum and guar gum.

In a further preferred method of the invention the polymer present in the produced water comprises monomers of acryl amide, acrylic acid and optionally acrylamide tertiary butyl sulfonate. Especially preferably the polymer present in the produced water is a hydrolysed polyacrylamide (HPAM) or is a sulfonated hydrolysed polyacrylamide (HPAM-AMPS).

The presence of polymer in the produced water typically causes problems in the produced water treatment system and in particular in hydrocyclones (HC) and in compact flotation units (CFU) which are used to remove hydrocarbons. Specifically the presence of polymer in produced water makes the removal of hydrocarbons in these units less efficient. The loss in efficiency is thought to be due to the polymer rheology introducing increased viscosity and elasticity to the produced water.

In a hydrocyclone the fluid spins at very high velocity and forms a centrifugal field which may reach 1000 G. The hydrocarbon droplets are forced toward the centre and are collected by an inner vortex with counter current flow. When a polymer is present in a fluid, however, the increased viscosity of the fluid increases the resistance to flow and dampens the intensity of the swirl and the increased elasticity shortens the length of the inner vortex which collects the hydrocarbon droplets and hence decreases the effective length of the hydrocyclone. A higher concentration of hydrocarbons is therefore present in the water exiting the hydrocyclone than when there is no polymer present in the water treated.

In a CFU the hydrocarbon droplets are separated from water by skimming them off of the surface of the water using a skimmer. The hydrocarbon droplets are brought to the surface of the water by the use of chemicals, e.g. flocculants, and air bubbles. Air bubbles are introduced into the bottom of the unit and they adhere to hydrocarbon droplets present throughout the water. The lift from the air bubbles eventually overcome the force of gravity and cause the hydrocarbon droplets to float to the surface. The presence of the flocculants helps to agglomerate the droplets into larger clusters. When a polymer is present in produced water present in a CFU, the polymer-oil interactions decrease the efficiency of the chemicals, such as flocculants. It is thought that the polymer prevents the chemicals from attaching to the droplets and surrounding them and thus larger agglomerates do not form so easily. It may also be the case that air bubbles are also prevented from interacting with the droplets and/or are forced to interact with polymer-oil droplets (rather than oil only droplets) and thus it is more challenging to lift the hydrocarbon droplets to the surface.

A key step in the method of the present invention is that multivalent cations are added to the produced water. Preferably the cations are divalent or trivalent but most preferably the cations are trivalent. Still more preferably the multivalent cations are trivalent aluminium cations or trivalent iron cations. In preferred methods of the invention, multivalent cations are not added in combination with another demulsifying agent. Particularly preferably the multivalent cations are not added in combination with a terminating agent (e.g. a coupling agent or a non-emulsifying hydrotrope containing terminal sulfonate or sulfate groups) or a polydithiocarbamate having at least two groups of the formula $(OR^1)_x NHC(:S)SR^2$, wherein $R^1$ represents an alkylene group of 1 to 30 carbon atoms, $R^2$ represents an alkali metal, an alkaline earth metal, an ammonium group or an amine group and x represents an integer of from 1 to about 250 independently selected for each of such groups such that the total of the integers is, on average, from 3 to 250.

The multivalent metal cations may be provided in the form of a metal salt or a metal complex. Representative examples of metal salts include $FeCl_3$, $Fe_2(SO_4)_3$, $AlCl_3$, $Al_2(SO_4)_3$, and $FeClSO_4$. A representative example of a metal complex is aluminium citrate. The multivalent metal cations may be added to the produced water in powder form or as a solution (e.g. in an aqueous solution). An aqueous solution is preferably used.

Without wishing to be bound by theory, it is thought that the multivalent cations increase the efficiency of the removal of hydrocarbon from produced water, e.g. in a hydrocyclone and/or CFU, by minimising the ability of the polymer to increase the viscosity and elasticity of the water and, in the case of CFUs, improving the flocculation of hydrocarbon droplets. It is thought that the multivalent cations, e.g. $Al^{3+}$ or $Fe^{3+}$, bind to the negatively charged groups in the polymer and form a stable cation-polymer complex. When trivalent cations such as $Al^{3+}$ and $Fe^{3+}$ are used, each metal cation may form up to three ionic bonds and it is thought that both intermolecular and intramolecular bonds form. Thus different parts of a long polymer chain may be attracted to a trivalent cation, and the effective length of the chain be dramatically decreased. Additionally different parts of a polymer chain maybe attracted to different trivalent cations and hence separate polymer chains become bonded together. The net effect of the interactions is that the effective length of polymer chains is decreased and the polymer chains are packed closely together. The consequence of these changes is that the polymer properties become less polymer like. Thus both the viscosity and elasticity of the water is decreased and the produced water behaves more like pure water during the removal of hydrocarbons. This improves the removal of hydrocarbons (i.e. deoiling) in hydrocyclones and compact flotation units.

In preferred methods of the invention, the multivalent cations minimise or prevent the viscosity increase associated with the presence of a polymer. Thus preferably the viscosity of the produced water from which hydrocarbons are moved is substantially similar to water lacking the polymer. Preferably the produced water from which hydrocarbons are removed (i.e. produced water comprising polymer and multivalent cations) has a viscosity of 1-5 cP and more preferably 1-2 cP. Preferably the treated produced water has a viscosity of 1-5 cP and more preferably 1-2 cP.

The amount of multivalent cations added to the produced water varies and depends, for example, on the concentration of the polymer, the level of separation achieved in the bulk separator, the nature of the crude production fluid and the level of purity that the final treated water must achieve. Typically, however, the concentration of multivalent metal cations in the mixture of produced water is 5-500 ppm wt, more preferably 10 to 250 ppm wt, still more preferably 20 to 200 ppm wt and especially preferably 30 to 100 ppm wt based on the total weight of water to be treated.

The addition of multivalent cations to produced water is preferably carried out by adding a solution of multivalent cations into a line transporting the produced water from the bulk separator to a first unit for removing hydrocarbons from the produced water, e.g. a hydrocyclone or CFU. This may be achieved, for example, by the use of a suitable inlet valve. Preferably a controlled dosing system is used. The resulting multivalent cation-containing produced water is preferably forced through a dispersing device, e.g. valve, nozzle or mixture, to distribute the multivalent cations throughout the water. This has the advantage that the multivalent cations and water are thoroughly mixed.

An advantage of the method of the present invention is that the multivalent cations may be added to the water over a wide range of temperatures and pressures. Thus the produced water may optionally be cooled, e.g. in a heat exchanger, prior to or after addition of multivalent cations. The pressure of the produced water may optionally be adjusted, e.g. decreased, prior to or after addition of multivalent cations.

In a preferred method of the present invention, the hydrocarbon present in the water is removed in a separator. Preferably the separator is a hydrocyclone, a flotation tank (e.g. a compact flotation unit) or a combination thereof.

The method of the present invention may comprise one or more hydrocarbon removal steps, e.g. one, two or three hydrocarbon removal steps. When multiple steps are used, each step may be carried out in the same or different types of separator. Preferably, however, the method of the invention comprises two or three hydrocarbon removal steps. Still more preferably the hydrocarbons are removed from the mixture of produced water and multivalent cations in a hydrocyclone and at least one compact flotation unit connected in series.

In a preferred method of the invention the hydrocarbon is removed from the mixture of produced water and multivalent cations in a hydrocyclone. The addition of the multivalent cations to the produced water is particularly advantageous during this hydrocarbon removal process as the cations increase the viscosity and elasticity of the produced water. This significantly improves the efficiency of the hydrocarbon removal process compared to when the multivalent cations are not present. As a result the majority of the hydrocarbons present in the produced water are removed in this process. Preferably the efficiency of the hydrocarbon removal in the hydrocyclone is at least 60%. More preferably the efficiency of the hydrocarbon removal in the hydrocyclone is 60 to 100% and still more preferably 70 to 95%. Any conventional hydrocyclone may be used and such devices are commercially available.

The water obtained from a hydrocyclone preferably comprises 0-100 ppm wt hydrocarbon, more preferably 0 to 50 ppm wt hydrocarbon, still more preferably 0 to 20 ppm wt hydrocarbon and especially preferably 0-10 ppm wt hydrocarbon. In some methods, the water obtained may be suitable for recycling to another polymer flood operation.

In another preferred method of the present invention the hydrocarbon is removed from the mixture of produced water and multivalent cations in a flotation tank, and preferably a compact flotation unit. Any conventional flotation tank, e.g. compact flotation unit (CFU) may be used. Such tanks are commercially available. The multivalent cations may improve the hydrocarbon removal process by attracting the polymer away from the hydrocarbon droplets, thereby allowing the flocculants to agglomerate the droplets and the air bubbles to lift the droplets to the surface. The hydrocarbon brought to the surface of the water in the tank can be removed by skimmers. Preferably the efficiency of the hydrocarbon removal in the flotation tank is at least 60%. More preferably the efficiency of the hydrocarbon removal in the flotation tank is 60 to 100% and still more preferably 70 to 95%. The conditions in the flotation tank are those conventionally used. Preferably the temperature is 70 to 95° C. Preferably the pressure is atmospheric pressure.

The water obtained from a flotation tank preferably comprises 0-100 ppm wt hydrocarbon, more preferably 0 to 50 ppm wt hydrocarbon, still more preferably 0 to 20 ppm wt hydrocarbon and especially preferably 0-10 ppm wt hydrocarbon. In some methods, the water obtained may be suitable for recycling to another polymer flood operation.

In a particularly preferred method of the invention a hydrocyclone and at least one flotation tank are connected in series. Thus preferably hydrocarbons are removed from produced water by a hydrocyclone and the treated water obtained from this step is then treated in a flotation tank to remove further hydrocarbons therefrom. Optionally further hydrocarbon removal steps may be employed, e.g. a second compact flotation tank.

In preferred methods of the invention, very little, if any, precipitate is formed. This is advantageous as precipitates can cause equipment failures, e.g. due to clogging or fouling. Precipitates may form in the method of the invention if the multivalent cations form salts with anions present in the water, e.g. hydroxides. This can, however, be avoided by adding an amount of multivalent cation that interacts with the polymer. It is believed that the cation-polymer interaction is stronger than, e.g. cation and hydroxide ion interaction, thus providing an excess of multivalent cations is not added, precipitate formation may be avoided. Preferably the amount of precipitate produced during the method is less than 0.5% by weight.

Preferably the method of the present invention yields treated water that may be recycled in another polymer flood. Preferably the method of the invention yields water comprising 0 to 50 ppm wt dispersed hydrocarbon, still more preferably 0 to 20 ppm wt dispersed hydrocarbon and especially 0 to 10 ppm wt dispersed hydrocarbon, e.g. 0 to 5 ppm wt dispersed hydrocarbon.

The water obtained by the method of the invention may comprise dissolved organic components, e.g. PAH, NPD and BTEX. Preferred processes of the invention further comprise a step of removing dissolved organic components. Similarly the water produced by the method of the invention may comprise dissolved inorganic components, e.g. salts, silica. Preferred processes of the invention further comprise a step of removing dissolved inorganic components. Conventional processes that are well known to the skilled man may be used, e.g. warm lime softening, media filtration and ion exchangers (WAC).

In preferred methods of the invention, the hydrocarbons removed are combined with the hydrocarbons separated from produced water, e.g. with the hydrocarbons separated from produced water in the bulk separator. In preferred methods of the invention, the hydrocarbons removed are not treated with a strong base.

The method of the present invention may be incorporated into a method of recovering hydrocarbons from a hydrocarbon-containing formation. Such methods comprise:
  (i) providing a composition comprising water and, optionally a polymer, to a hydrocarbon-containing formation;
  (ii) allowing the composition to contact at least a proportion of the hydrocarbons in said formation;
  (iii) recovering from said formation a mixture comprising hydrocarbons, water and, optionally a polymer;
  (iv) separating the mixture into recovered hydrocarbons and produced water; and
  (v) removing hydrocarbons from the produced water by the method hereinbefore described In a preferred method of the invention the treated produced water is reinjected into a formation in a recovery operation, e.g. a polymer flood operation.

Although the methods of the present invention are particularly advantageous when the produced water from the recovery operation comprises polymer because it improves the efficiency of hydrocarbon removal step, the method is also useful when no polymer is present. In this case the hydrocarbon removal efficiency is still increased. Moreover the multivalent metal cations accumulate in the hydrocarbon removed from the mixture, e.g. the concentration of multivalent metal cations in the hydrocarbons removed from the mixture may be greater than 1000 ppm. Thus the treated water obtained from the process comprises a very low concentration of hydrocarbons and a low concentration of multivalent cations. The treated water is thus suitable for reinjection into a formation in a recovery operation.

The separation of hydrocarbons and water in step (iv) is preferably carried out in a bulk separator. Any conventional separator, e.g. a gravity separator, a cyclone separator or a vortex separator, may be used. Preferably, however, the separator is a gravity separator. The separator optionally includes means for separation of gas from the mixture. The separator optionally includes means for separation of solids from the mixture. The separator is operated under conditions that are conventional in the art. The separator may be operated in a continuous, semi-continuous or batchwise manner.

In the bulk separator the hydrocarbon and water mixture is separated to yield separated hydrocarbon and produced water. The mixture is fed into the bulk separator and allowed to separate out to a gas phase, a hydrocarbon phase, a water phase and a solids phase in vertically descending order. Optionally chemicals such as emulsion breakers may be added to the separator to improve the separation. The separated hydrocarbon is preferably removed from the bulk separator via a hydrocarbon outlet. Preferably the separated hydrocarbon is transported to a treater for processing. The separated produced water is preferably removed from the bulk separator via a water outlet. Hydrocarbons are preferably removed from the produced water by the method as hereinbefore described.

An advantage of the methods of the present invention is that it can be carried out using conventional equipment, i.e. conventional separators, hydrocyclones, flotation tanks, filters etc. Such equipment is all commercially available. The only modifications required to carry out the method of the present invention is that an inlet for multivalent cations and optionally a dispersing device be provided in the line transporting produced water to the first unit for removing hydrocarbons from the produced water and a tank be provided for storage of multivalent cations.

The present invention also provides a system for removing hydrocarbons from produced water comprising:
(i) a bulk separator for separating a mixture of hydrocarbon and water into hydrocarbons and produced water;
(ii) a hydrocyclone and/or a compact flotation unit for removing hydrocarbons from the produced water;
(iii) a line for adding multivalent cations into the produced water; and
(iv) a tank for storing multivalent metal cations,
wherein the tank is fluidly connected to the line for adding multivalent cations and the line for adding the multivalent cations into the produced water is prior to the hydrocyclone and/or compact flotation unit. Preferably the water outlet of the bulk separator is fluidly connected to the hydrocyclone or compact flotation unit.

Preferred systems of the invention comprise a hydrocyclone and at least one (e.g. two) compact flotation unit connected in series. In this case the treated produced water exiting the hydrocyclone, passes to a compact flotation unit. Optionally further multivalent cations are added to the treated produced water prior to its entry into the second unit.

Further preferred systems of the invention comprise a dispersing device for dispersing the multivalent cations throughout the water, e.g. valves, nozzles or mixers etc. Valves are generally preferred. Suitable valves, nozzles and mixers are commercially available.

In some preferred systems of the invention a cooler is present in between the bulk separator and the hydrocyclone and/or compact flotation unit. In this case the cooler is fluidly connected to a water outlet of a bulk separator and comprises a cooled water outlet fluidly connected to the hydrocyclone and/or compact flotation unit. In other preferred systems, the cooler is after the hydrocyclone and/or compact flotation unit and in this case the water outlet of the hydrocyclone and/or compact flotation unit is fluidly connected to the water inlet of said cooler. Preferably the outlet of the cooler is fluidly connected to a second hydrocyclone and/or compact flotation unit.

The inlet for multivalent cations is after the bulk separator and before the hydrocyclone and/or compact flotation unit. The inlet for multivalent cations may be prior to or after the cooler.

BRIEF DESCRIPTION OF THE DRAWINGS

The invention will now be described with reference to the following non-limiting Figures and examples wherein.

EXAMPLES

Figure 1:
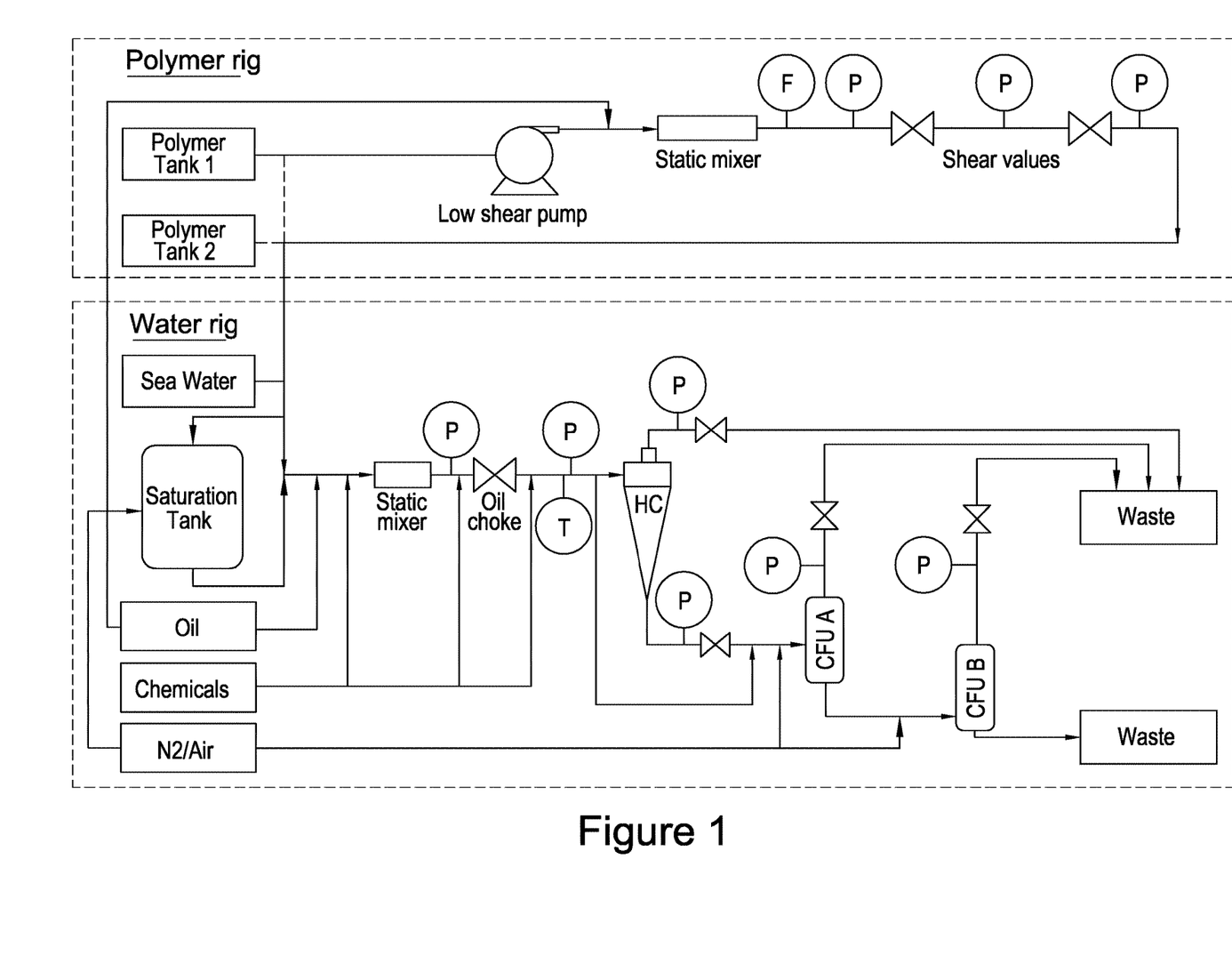
FIG. 1 is a schematic of a large scale test rig used in the examples described herein.

Materials
HPAM-AMPS polymer, i.e. sulfonated hydrolysed polyacrylamide comprising monomers of acryl amide, acrylic acid and acrylamide tertiary butyl sulfonate.
The polymers used were purchased commercially.
General Method: Description of Test Rig
A large-scale test rig as shown in FIG. 1 was used to generate the data contained in the Examples described herein. The test rig comprised a polymer rig connected to a water rig. The water rig comprised a full-scale hydrocyclone (HC) liner and two down-scaled, downstream compact flotation unit (CFU) tanks. The running conditions of the test rig were as follows:
fluid flow rate: 3 m³/h;
temperature: 50° C.; and
pressure: in the range of 20 to 30 barg.
The polymer rig comprised two separate polymer tanks, with each tank having a capacity for 4.5 m³ of pre-mixed polymer solution. The polymer was pumped to a pressure of 60 barg and sheared by applying various pressure drops over the shear valves to simulate shear degraded breakthrough polymer.

After mixing the polymer solution with hydrocarbons from an oil tank in the water rig, the mixture was added to seawater. A pressure drop of typically 5 to 15 bar was then applied over the oil choke to generate oil droplets having a size of 10-20 μm to simulate produced water.

Multivalent metal cations, e.g. $Fe^{3+}$ or $Al^{3+}$ cations, were then introduced to the simulated produced water at various locations upstream of the hydrocyclone.

The test rig was equipped with on-line oil-in-water analysis, such that any changes to the efficiency of the hydrocarbon removal method could be detected immediately. Droplet size and viscosity was determined after sampling from the test rig. Samples were taken from sampling points upstream of the hydrocyclone, downstream of the hydrocyclone and downstream of the CFUs.

Example 1

Effect of the Addition of Multivalent Metal Ions on the Viscosity of Produced Water A test rig as described above was set up. The polymers employed in the polymer tanks were HPAM-AMPS polymers, i.e. sulfonated hydrolysed polyacrylamides comprising monomers of acryl amide, acrylic acid and acrylamide tertiary butyl sulfonate. The concentration of polymer in the simulated produced water was set at either 100 ppm or 500 ppm.

Different concentrations of $Fe^{3+}$ cations were then introduced to the simulated produced water upstream of the hydrocyclone. Samples were taken from the test rig and the viscosity of the resultant mixture was tested at 20° C., and at a shear rate of 25 $s^{-1}$, using a laboratory rheometer. The results are shown in FIG. 2.

Figure 2:
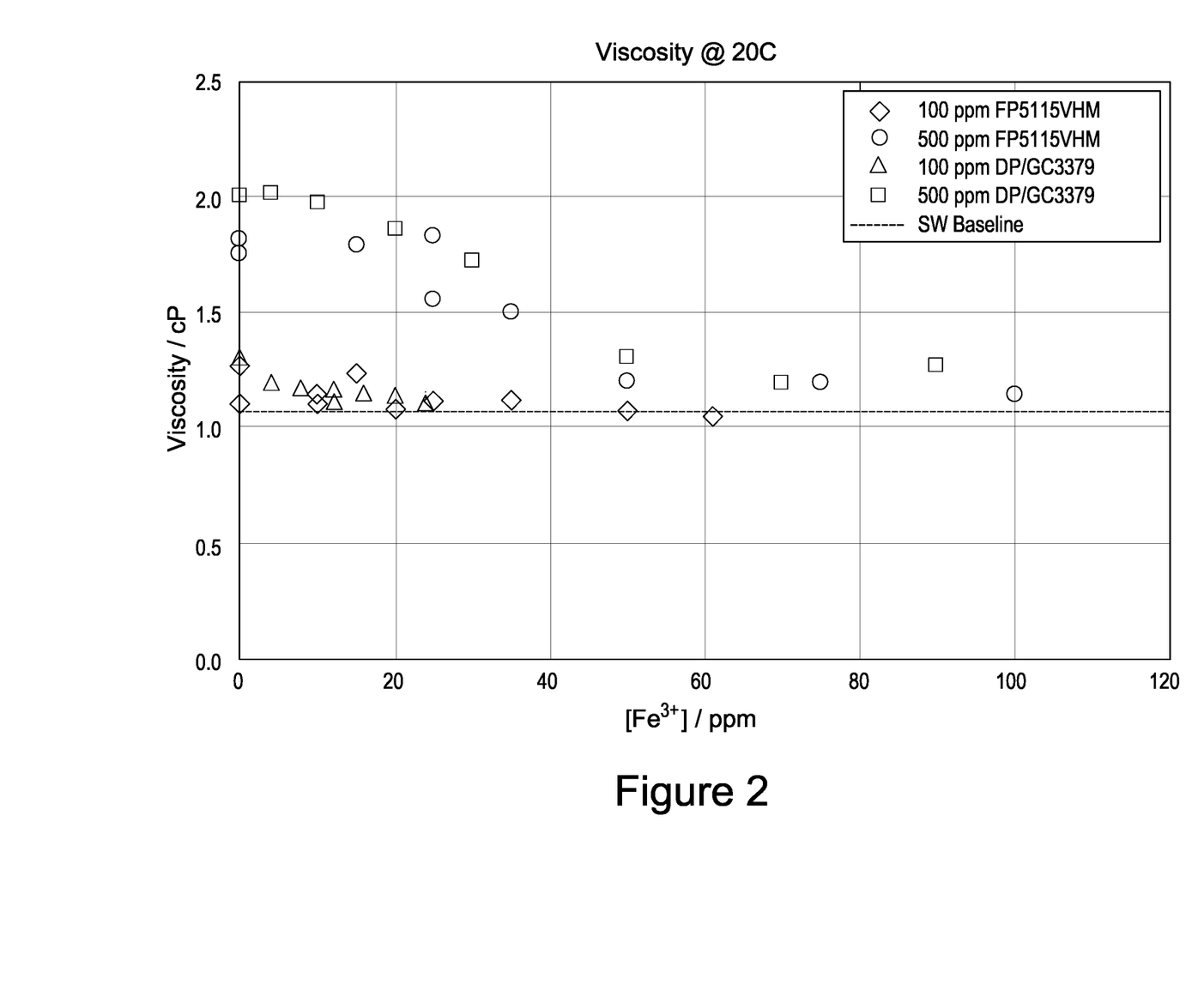
FIG. 2 is a plot of viscosity (cP) versus iron concentration (ppm) of simulated produced water comprising different concentrations and types of polymer.

FIG. 2 shows a graph of viscosity versus $Fe^{3+}$ cation concentration. The horizontal dotted line indicates the baseline viscosity for seawater, which does not contain any polymer. The viscosity of seawater is unaffected by an increasing concentration of $Fe^{3+}$ cations. In contrast, when the concentration of $Fe^{3+}$ is zero, the viscosity of produced water containing polymer is higher than the viscosity of seawater.

The results show that as the concentration of $Fe^{3+}$ cations increases, the viscosity of the produced water containing polymers approaches the viscosity of a solution that does not contain any amount of polymer (i.e. the baseline viscosity for seawater). This is thought to be due to the $Fe^{3+}$ cations binding to the anionic sites of the polymer molecules and thereby minimising the ability of the polymer to increase the viscosity of the water phase.

This corroborated by the fact that the observed effect is more pronounced when a greater concentration of polymer is present in the simulated produced water. The initial viscosity (i.e. when the $Fe^{3+}$ concentration is zero) for simulated produced water containing 500 ppm polymer (plots of red circles or orange squares) is much higher than for simulated produced water containing 100 ppm polymer (plots of light blue triangles and dark blue diamonds). This means that a higher concentration of Fe3+ cations is required to ensure the viscosity of produced water containing a larger amount of polymer approaches the baseline viscosity.

Reducing the viscosity of the simulated produced water improves the efficiency of the hydrocarbon removal methods in the hydrocyclone and CFUs.

Example 2

Analysis of the Efficiency of a Hydrocarbon Removal Method Using CFUs

A test rig as described above was set up. In this example, however, the hydrocyclone was bypassed such that the simulated produced water entered the first CFU directly. The polymers employed in the polymer tanks were HPAM-AMPS polymers. The concentration of polymer in the simulated produced water was set at either 100 ppm or 500 ppm. Different concentrations of $Fe^{3+}$ cations were then introduced to the simulated produced water upstream of the first CFU. The results are shown in FIG. 3.

Figure 3:
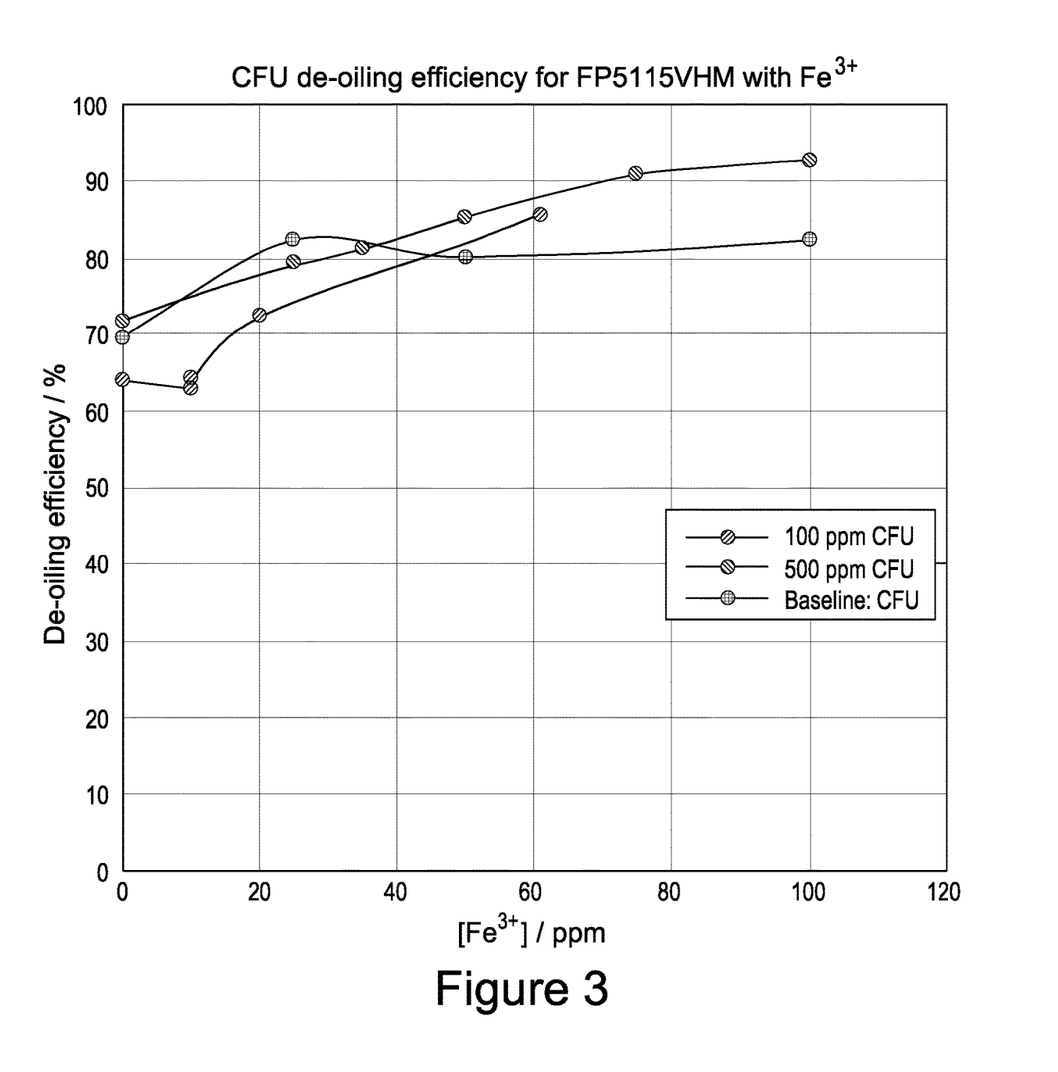
FIG. 3 is a plot of hydrocarbon removal (de-oiling) efficiency for a CFU versus $Fe^{3+}$ cation concentration from produced water comprising different concentrations and types of polymer.

FIG. 3 shows a graph of hydrocarbon removal (de-oiling) efficiency versus $Fe^{3+}$ cation concentration. The results show that as the concentration of $Fe^{3+}$ cations increases, the efficiency of the hydrocarbon removal method in the CFUs approaches that of the baseline efficiency, i.e. the efficiency when a polymer is not present in the produced water. This effect occurs at both polymer concentrations, e.g. at 100 ppm and at 500 ppm. It is also observed that a higher concentration of $Fe^{3+}$ cations is required to ensure the hydrocarbon removal efficiency for produced water containing a larger amount of polymer approaches the baseline efficiency.

FIG. 3 also shows that at certain concentrations of $Fe^{3+}$ cations, the hydrocarbon removal efficiency increases above the baseline efficiency. This may be due to interactions between the hydrocarbon droplets, $Fe^{3+}$ cations and polymer molecules.

Example 3

Analysis of the Efficiency of a Hydrocarbon Removal Method Using a Hydrocyclone and a CFU in Series A test rig as described above was set up. The polymers employed in the polymer tanks were HPAM-AMPS polymers. The concentration of polymer in the simulated produced water was set at either 100 ppm or 500 ppm. $Fe^{3+}$ cations were then introduced to the simulated produced water upstream of the hydrocyclone. The results are shown in FIG. 4.

Figure 4:
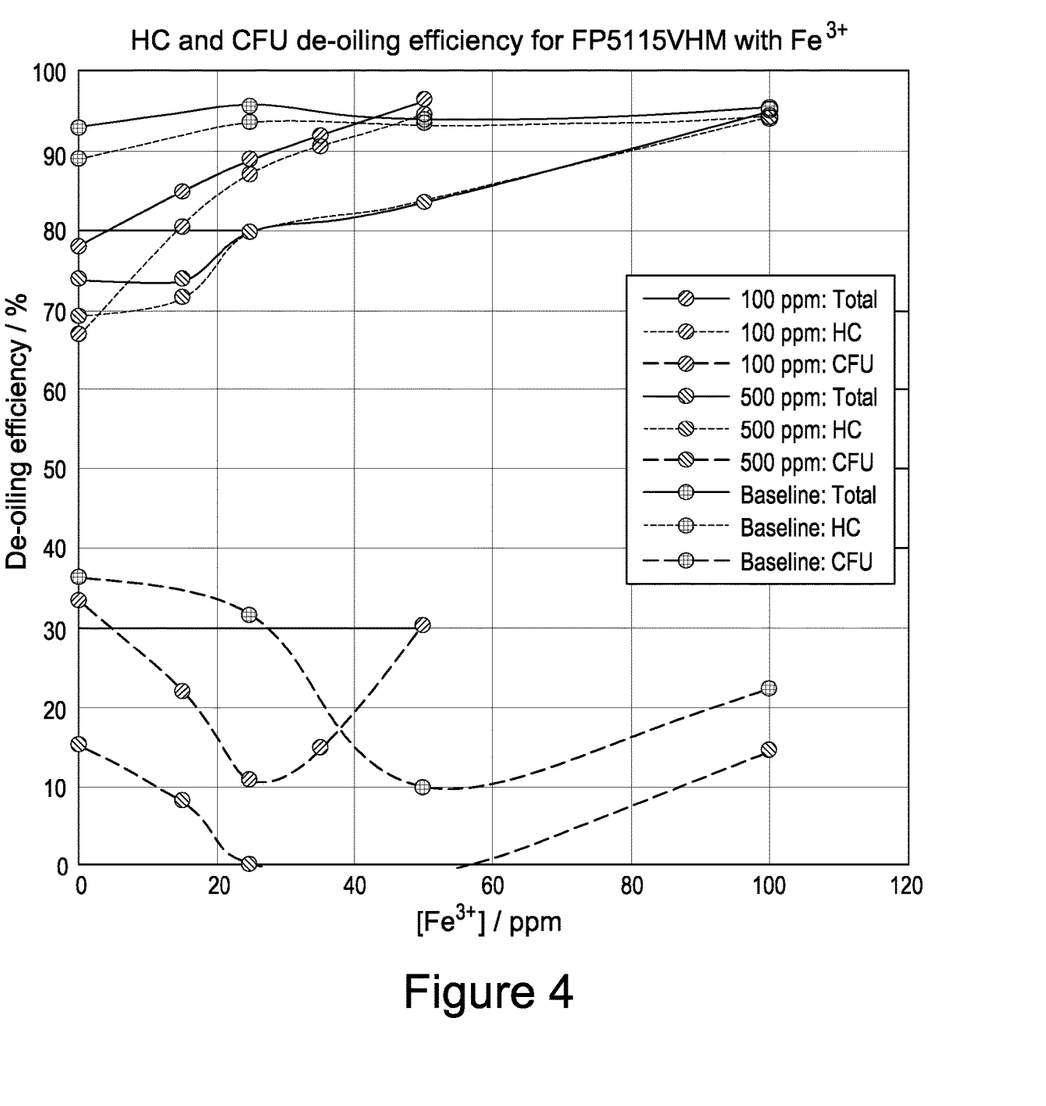
FIG. 4 is a plot of hydrocarbon removal (de-oiling) efficiency for a hydrocyclone and for a hydrocyclone and CFU connected in series as well as overall hydrocarbon removal efficiency versus $Fe^{3+}$ cation concentration from produced water comprising different concentrations and types of polymer.

FIG. 4 shows a graph of hydrocarbon removal (de-oiling) efficiency versus $Fe^{3+}$ cation concentration. Separate plots for the efficiency of the hydrocyclone and of the CFUs are shown, in addition to a total plot for the efficiency of the overall method.

The results show that as the concentration of $Fe^{3+}$ cations increases, the overall hydrocarbon removal efficiency approaches that of the baseline, i.e. the efficiency when a polymer is not present in the produced water, for all of the tested combinations, i.e. the hydrocyclone alone, the CFU alone, and the hydrocyclone and CFU in series.

The results also show that the negative effects of the presence of a polymer in the simulated produced water on the efficiency of the hydrocarbon removal method increases with increasing polymer concentration. Thus, it is necessary to increase the concentration of $Fe^{3+}$ cations when the concentration of polymer also increases.

Example 4

Recycling of Treated Produced Water

The treated produced water produced in the methods of the present invention can be recycled and used in a further polymer flooding cycle. Investigations into the whether the presence of $Fe^{3+}$ cations in the treated produced water would affect the viscosity in a new polymer flooding cycle when polymer is added were therefore conducted.

A test rig as described above was set up. The polymers employed in the polymer tanks were HPAM-AMPS polymers. The concentration of polymer in the simulated produced water was set at either 100 ppm or 500 ppm. $Fe^{3+}$ cations were then introduced to the simulated produced water upstream of the hydrocyclone.

Samples of simulated treated produced water were taken from the CFU water outlet after having been treated with differing concentrations of $Fe^{3+}$ cations (25, 50 and 100 ppm). An additional 2000 ppm of a HPAM-AMPS polymer was added to each of samples to simulate a second polymer flood. The viscosity of each sample was then measured as a function of shear rate and compared to the viscosity of sea water also containing 2000 ppm HPAM-AMPS polymer but without the presence of $Fe^{3+}$ cations from the treatment following the first polymer flood operation. The results are shown in FIG. 5.

Figure 5:
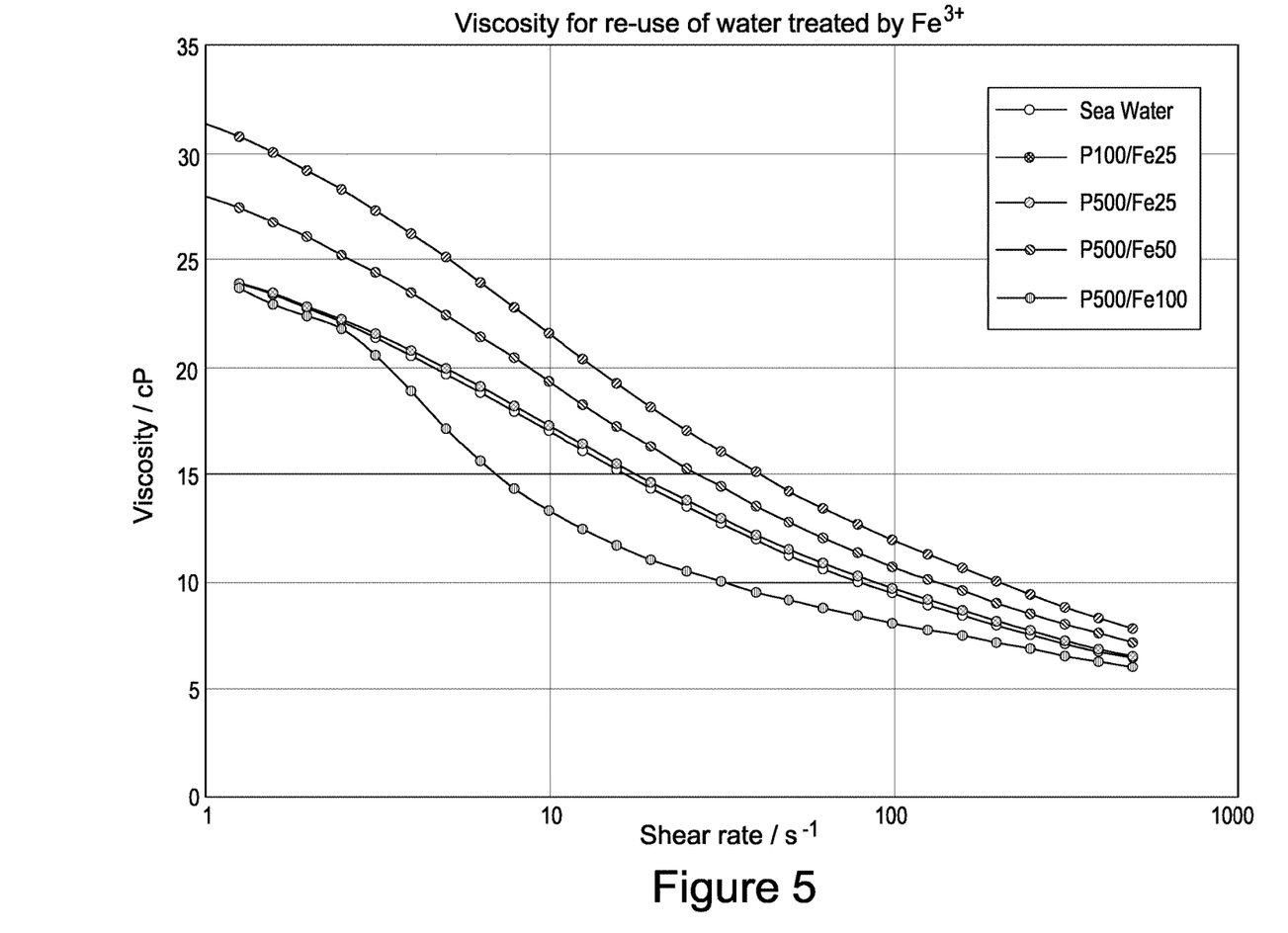
FIG. 5 is a plot of viscosity (cP) versus shear rate ($s^{-1}$) for samples of simulated treated produced water taken from the CFU water outlet (after having been treated with differing concentrations of $Fe^{3+}$ cations) and having further polymer introduced therein.

FIG. 5 shows a graph of viscosity versus shear rate for each of the tested samples. The results show that the presence of low concentrations of $Fe^{3+}$ cations did not have a significant effect on the viscosity of the polymer-containing water and thus would not be expected to have a negative effect on a new polymer flooding cycle. The red plot (labelled P100/Fe25) shows the result for simulated treated produced water containing 100 ppm polymer and treated with 25 ppm $Fe^{3+}$ cations. After adding an additional 2000 ppm of polymer a negative effect on the viscosity was not observed due to the presence of $Fe^{3+}$ cations (based on a comparison to the seawater baseline test).

The green and purple plots (labelled P500/Fe25 and P500/Fe50, respectively) show the results for simulated treated produced water containing 500 ppm polymer and either 25 or 50 ppm $Fe^{3+}$ cations. After adding an additional 2000 ppm of polymer, the viscosity of each of these samples was found to be only slightly higher than the baseline viscosity. It is thought that this effect could be overcome by increasing the amount of $Fe^{3+}$ cations added.

The light blue plot (labelled P500/Fe100) shows the results for treated produced water containing 500 ppm polymer and 100 ppm $Fe^{3+}$ cations. After adding an additional 2000 ppm of polymer, the viscosity of this sample was found to be lower than the baseline viscosity. This is thought to be due to the concentration of $Fe^{3+}$ cations being high enough to also influence the additional polymer added into the treated produced water.

These results show that it is possible to use the treated produced water of the methods of the present invention in a further polymer flooding cycle.

Example 5

Evaluation of Precipitation of Metal-Rich Compounds

Multivalent metal cations such as $Fe^{3+}$ cations may precipitate with hydroxides and/or carbonates present in the produced water. It was therefore decided to evaluate the extent of precipitation as the concentration of multivalent metal cation increases.

A test rig as described above was set up. The polymers employed in the polymer tanks were HPAM-AMPS polymers. The concentration of polymer in the simulated produced water was set at either 100 ppm or 500 ppm. $Fe^{3+}$ cations were then introduced to the simulated produced water upstream of the hydrocyclone.

Samples of treated produced water were collected from the water outlet of the hydrocyclone (dark blue and red plots) or from the water outlet of the second CFU (light blue and orange plots). The samples were then centrifuged and evaluated for the presence of any precipitates. The results are shown in FIG. 6.

Figure 6:
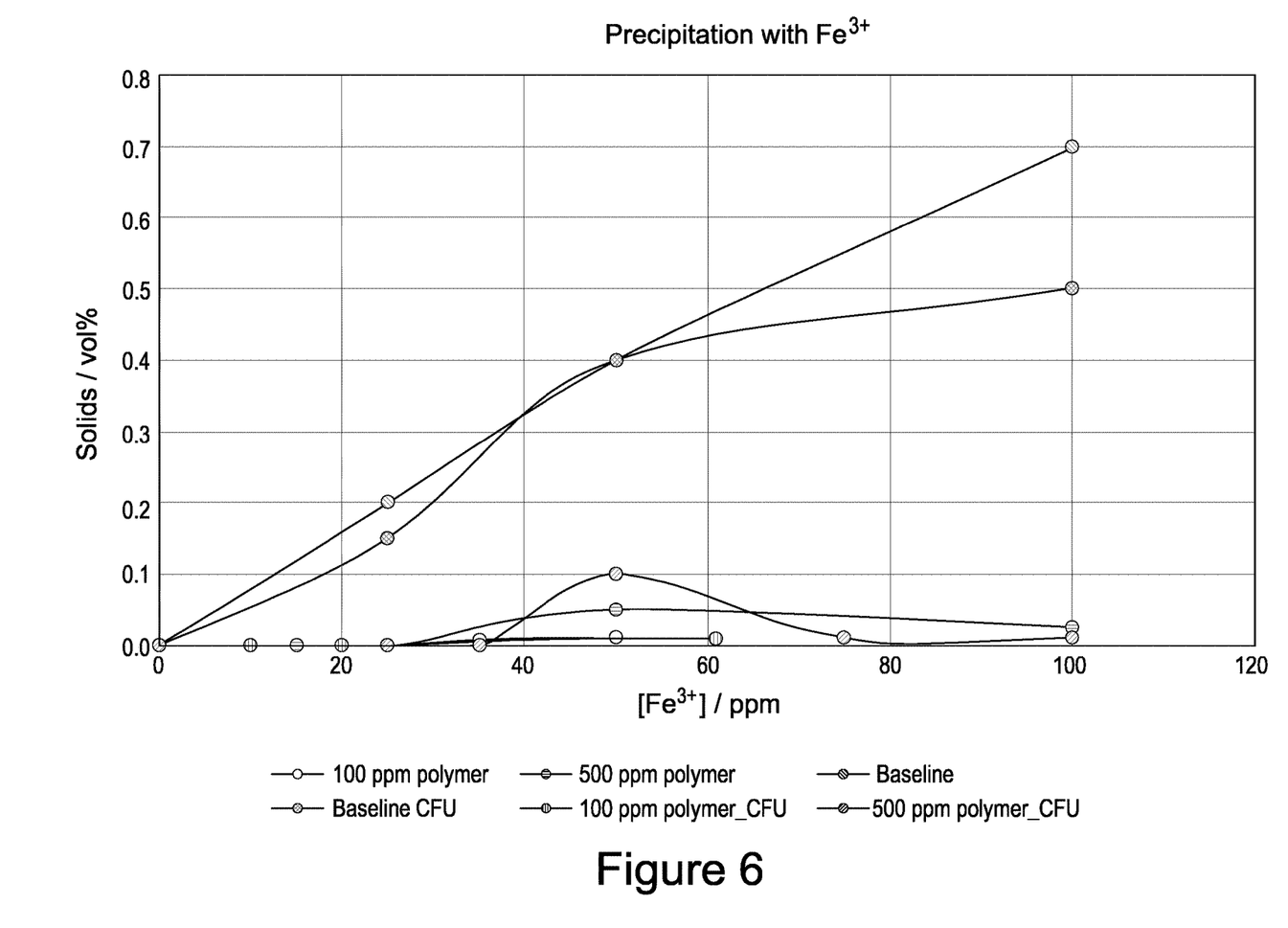
FIG. 6 is a plot of the amount of precipitation versus concentration of $Fe^{3+}$ cations in simulated produced water.

FIG. 6 shows a graph of the amount of precipitation versus concentration of $Fe^{3+}$ cations. Baseline tests were performed using seawater, which did not contain any polymer (green plot is hydrocyclone baseline and purple plot is CFU baselines). In these tests, a large amount of precipitate formed which increased as the concentration of $Fe^{3+}$ cations increased. The formation of precipitates is thought to be due to the presence of carbonates and/or hydroxides in the sea water. Tests conducted on simulated treated produced water containing a polymer resulted in the formation of considerably less precipitate.

These results suggest that the $Fe^{3+}$ cations bind the polymer molecules as stable cation-polymer complexes. This is because the $Fe^{3+}$ cations have a higher affinity for the anionic polymer molecules than the hydroxides and/or carbonates also present and so do not form the precipitates observed during the baseline tests.

Example 6

Evaluation of Metal Accumulation

It was decided to evaluate whether either iron or polymer were accumulating in a particular phase e.g. in the water or in the oil phase.

A test rig as described above was set up. The polymers employed in the polymer tanks were HPAM-AMPS polymers. The concentration of polymer in the simulated produced water was set at either 100 ppm or 500 ppm. $Fe^{3+}$ cations were then introduced to the simulated produced water upstream of the hydrocyclone.

Samples of treated produced water were collected from the hydrocyclone water inlet ($Fe_{HC-In}$), from the hydrocyclone water outlet ($Fe_{HC-Out}$), from the hydrocyclone reject line ($Fe_{HC-Reject}$), from the CFU reject line ($Fe_{CFU-Reject}$) and from the CFU water outlet ($Fe_{CFU-Out}$). The results are shown in the table below. The iron concentration in the water phase was assessed by Inductive Coupled Plasma Optical Emission Spectroscopy (ICP-EOS).

| Polymer ppm | Fe ppm | HCl Y/N | $Fe_{HC-in}$ ppm | $Fe_{HC-Out}$ ppm | $Fe_{HC-Reject}$ ppm | $Fe_{CFU-Out}$ ppm | $Fe_{CFU-Reject}$ ppm | Mean ppm | St.dev. ppm |
|---|---|---|---|---|---|---|---|---|---|
| — | 25 | Y | 17 | 20 | 57 | 19 | 16 | 26 | 18 |
| — | 100 | Y | 74 | 81 | 87 | 48 | 67 | 71 | 15 |
| 100 | 25 | N | 19 | 17 | 14 | 18 | 12 | 16 | 3 |
|  |  | Y | 19 | 18 | 21 | 12 | 18 | 18 | 3 |
| 500 | 50 | N | 12 | 27 | 36 | 24 | 36 | 27 | 10 |
|  |  | Y | 34 | 38 | 36 | 37 | 35 | 36 | 2 |

Two compositions from the baseline tests (i.e. seawater containing no polymer) and two compositions from the polymer tests were selected, and some samples were further treated with hydrochloric acid to dissolve any iron-containing precipitates. Even though some results showed relatively high standard deviation, and some data fell outside it (marked in red and orange to indicate high or low standard deviation, respectively), there was no clear trend of any iron enrichment. It can therefore be concluded that iron was not enriched in any of the water phases during the hydrocarbon removal method.

The table below shows the analyses of iron concentration in the oil phase of the hydrocyclone reject line by ICP-EOS, followed by microwave digestion.

| Polymer ppm | Fe ppm | Oil ppm | Fe in oil ppm |
|---|---|---|---|
| — | 25 | 300 | 1660 |
| — | 100 | 300 | 1660 |
| 100 | 25 | 300 | 210 |
| 600 | 25 | 300 | 30 |
| 600 | 50 | 300 | 900 |

The results indicate an enrichment of iron occurs in the oil phase of the hydrocyclone reject line. The baseline samples (i.e. seawater not containing polymer) were found to contain a very high concentration of iron in the oil phase of the hydrocyclone reject line (e.g. 1560 ppm). Conversely, when polymer was present in sample, the iron enrichment in the oil phase was much lower. This is thought to be due to the high affinity between the polymer and $Fe^{3+}$ cations, which renders the iron less available for interactions with the oil phase.

The table below shows the analyses of polymer concentration in the water phase by Size-Exclusive Chromatography (SEC-UV).

| Polymer ppm | Fe ppm | HCl Y/N | $Fe_{HC-In}$ ppm | $Fe_{HC-Out}$ ppm | $Fe_{HC-Reject}$ ppm | $Fe_{CFU-Out}$ ppm | $Fe_{CFU-Reject}$ ppm | Mean ppm | St. dev. ppm |
|---|---|---|---|---|---|---|---|---|---|
| 100 | 25 | N | 167 | 121 | 131 | 91 | 135 | 129 | 27 |
| 500 | 25 | N | 601 | 147 | 593 | 229 | 571 | 428 | 221 |
| 500 | 50 | N | 152 | 161 | 149 | 207 | 136 | 161 | 27 |

Although the presence of iron in the samples made the determination of polymer concentration difficult such that some measurements fell outside the standard deviation of the test results, the data in the table is in general agreement that the polymer was not enriched in any of the water phases tested.

The invention claimed is:

1. A method for removing hydrocarbons from produced water, comprising: (i) separating produced water from a hydrocarbon and water mixture extracted from a subterranean formation; (ii) contacting said produced water with multivalent metal cations to produce a mixture of produced water and multivalent metal cations; and (iii) removing hydrocarbons from said mixture in a hydrocyclone and/or a compact flotation unit to give treated produced water, wherein a concentration of hydrocarbons in said produced water is less than 10% wt; and wherein an amount of precipitate produced during the method is less than 0.5% by weight.

2. A method as claimed in claim 1, wherein the concentration of hydrocarbons in said produced water is less than 5% wt.

3. A method as claimed in claim 1, wherein said produced water comprises a polymer.

4. A method as claimed in claim 3, wherein a concentration of said polymer in said produced water is 50-5000 ppm.

5. A method as claimed in claim 3, wherein said polymer is a water- soluble polymer.

6. A method as claimed in claim 3, wherein said polymer is an anionic polymer.

7. A method as claimed in claim 6, wherein said polymer comprises monomers of acryl amide and acrylic acid.

8. A method as claimed in claim 7, wherein said polymer is a hydrolysed polyacrylamide (HPAM).

9. A method as claimed in claim 8, wherein said polymer further comprises monomers of acrylamide tertiary butyl sulfonate.

10. A method as claimed in claim 9, wherein said polymer is a sulfonated hydrolysed polyacrylamide.

11. A method as claimed in claim 1, wherein a concentration of multivalent metal cations in said mixture is 5-500 ppm.

12. A method as claimed in claim 1, wherein said multivalent metal cations comprise trivalent metal cations.

13. A method as claimed in claim 1, wherein said multivalent metal cations are trivalent aluminium cations or trivalent iron cations.

14. A method as claimed in claim 1, wherein said multivalent metal cations are provided in the form of a metal salt or a metal complex.

15. A method as claimed in claim 14, wherein said metal salt is selected from $FeCl_3$, $Fe_2(SO_4)_3$, $AlCl_3$, $Al_2(SO_4)_3$, and $FeClSO_4$.

16. A method as claimed in claim 14, wherein said metal complex is aluminium citrate.

17. A method as claimed in claim 1, wherein in step (iii) the hydrocarbons are removed from said mixture in a hydrocyclone and at least one compact flotation unit connected in series.

18. A method as claimed in claim 1, wherein an efficiency of the hydrocarbon removal in step (iii) is at least 60%.

19. A method as claimed in claim 1, wherein the concentration of hydrocarbons in said treated produced water is 0-100 ppm.

20. A method of recovering hydrocarbons from a hydrocarbon-containing formation, said method comprising: (i) providing water, to a hydrocarbon-containing formation; (ii) allowing said water to contact at least a proportion of the hydrocarbons in said formation; (iii) recovering from said formation a mixture comprising hydrocarbons and water; (iv) separating said mixture into recovered hydrocarbons and produced water; and (v) removing hydrocarbons from said produced water according to the method of claim 1 to give treated produced water.

21. A method as claimed in claim 20, wherein said treated produced water is reinjected into a formation in a recovery operation.

22. A method as claimed in claim 3, wherein said multivalent cations are not added in excess in relation to said polymer.

* * * * *